United States Patent [19]
Briggs et al.

[11] Patent Number: 5,259,052
[45] Date of Patent: Nov. 2, 1993

[54] HIGH PRECISION OPTICAL FIBER CONNECTORS

[75] Inventors: Robert C. Briggs, Newport; Lloyd R. Budd, Harrisburg; John C. Hoffer, Harrisburg; William J. Stape, Harrisburg; Donald W. Thompson, Mechanicsburg; Robert N. Weber, Hummelstown, all of Pa.

[73] Assignee: AMP Incorporated, Harrisburg, Pa.

[21] Appl. No.: 656,264

[22] Filed: Feb. 11, 1991

Related U.S. Application Data

[60] Division of Ser. No. 439,206, Nov. 17, 1989, Pat. No. 5,076,656, which is a continuation-in-part of Ser. No. 734,831, May 17, 1985, abandoned, and a continuation-in-part of Ser. No. 236,103, Aug. 23, 1988, abandoned, and a continuation-in-part of Ser. No. 287,921, Dec. 21, 1988, abandoned, and a continuation-in-part of Ser. No. 328,259, Mar. 23, 1989, abandoned, said Ser. No. 734,831, is a continuation-in-part of Ser. No. 618,851, Jun. 8, 1984, Pat. No. 4,687,291, said Ser. No. 287,921, is a continuation-in-part of Ser. No. 734,821, May 16, 1985, abandoned, and a continuation-in-part of Ser. No. 112,188, Oct. 26, 1987, abandoned, and a continuation-in-part of Ser. No. 185,756, Apr. 25, 1988, abandoned, which is a continuation-in-part of Ser. No. 112,188, Apr. 25, 1988, said Ser. No. 328,259, is a continuation-in-part of Ser. No. 734,831, May 17, 1985, abandoned, and a continuation-in-part of Ser. No. 112,188, May 17, 1985, and a continuation-in-part of Ser. No. 185,756, May 17, 1985, and a continuation-in-part of Ser. No. 287,921, May 17, 1985.

[51] Int. Cl.$^5$ ............................................. G02B 6/36
[52] U.S. Cl. ............................................. 385/78
[58] Field of Search ............. 385/56, 58, 59, 60, 385/71, 70, 72, 77, 78

[56] References Cited

U.S. PATENT DOCUMENTS

| | | | |
|---|---|---|---|
| 4,611,887 | 9/1986 | Glover et al. | 385/71 |
| 4,779,952 | 10/1988 | Hayashi et al. | 385/66 |
| 4,787,706 | 11/1988 | Cannon, Jr. et al. | 350/96.20 |

Primary Examiner—John D. Lee
Assistant Examiner—John Ngo
Attorney, Agent, or Firm—Gerry K. Kita; Driscoll A. Nina, Jr.

[57] ABSTRACT

A duplex fiber optic connector assembly enables mating the fibers of a first multifiber cable with like fibers of a second cable or cables with maximum axial alignment of the respective fiber paris. An interconnect member receives cable terminating connectors in opposite sides thereof. Each connector carries the fibers of a respective cable in individual ferrules, each ferrule having limited floating mount within the respective connector. The mating pairs of ferrules are received in opposite ends of receptor members each of which has an axially profiled bore adapted to receive the respective ferrules and a profiled outer surface which allows movement about the geometric center of the receptor so as to axially align the bores of the ferrules received therein. Connectors at each end of a predetermined length of fiber optic cable provide a fiber optic extension cord, analogous to the well-known electrical extension cord, for convenient and efficient interconnection between optical signal-using equipments. Small interconnect members receive the connectors of such fiber optic extension cords to allow even wider-ranging interconnections. Wall boxes containing such interconnect members, connected to permanently installed fiber optic cables conveying optical signals from a central optical signal source, allow a user to readily access optical signals by "plugging-in" a connector therein.

14 Claims, 7 Drawing Sheets

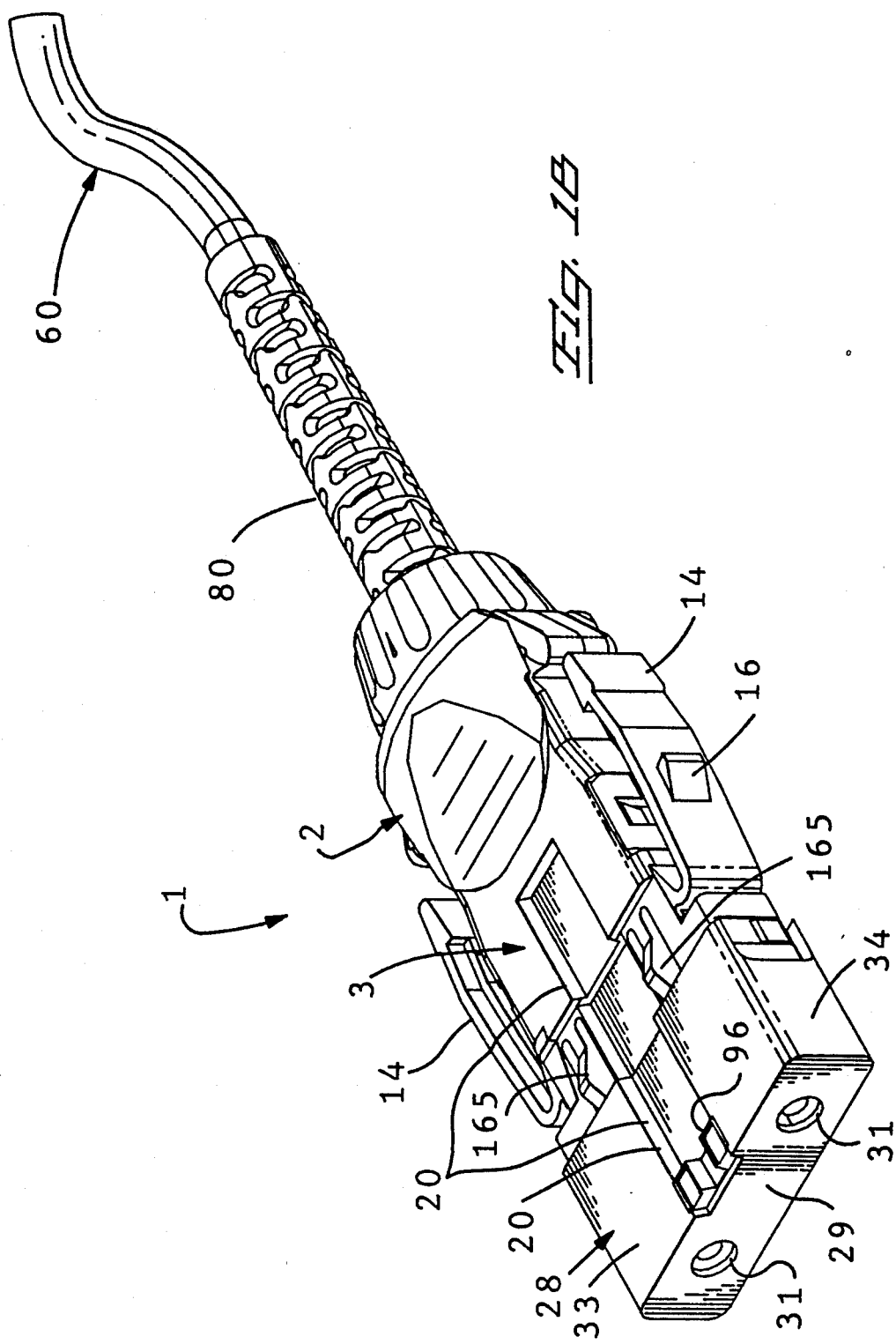

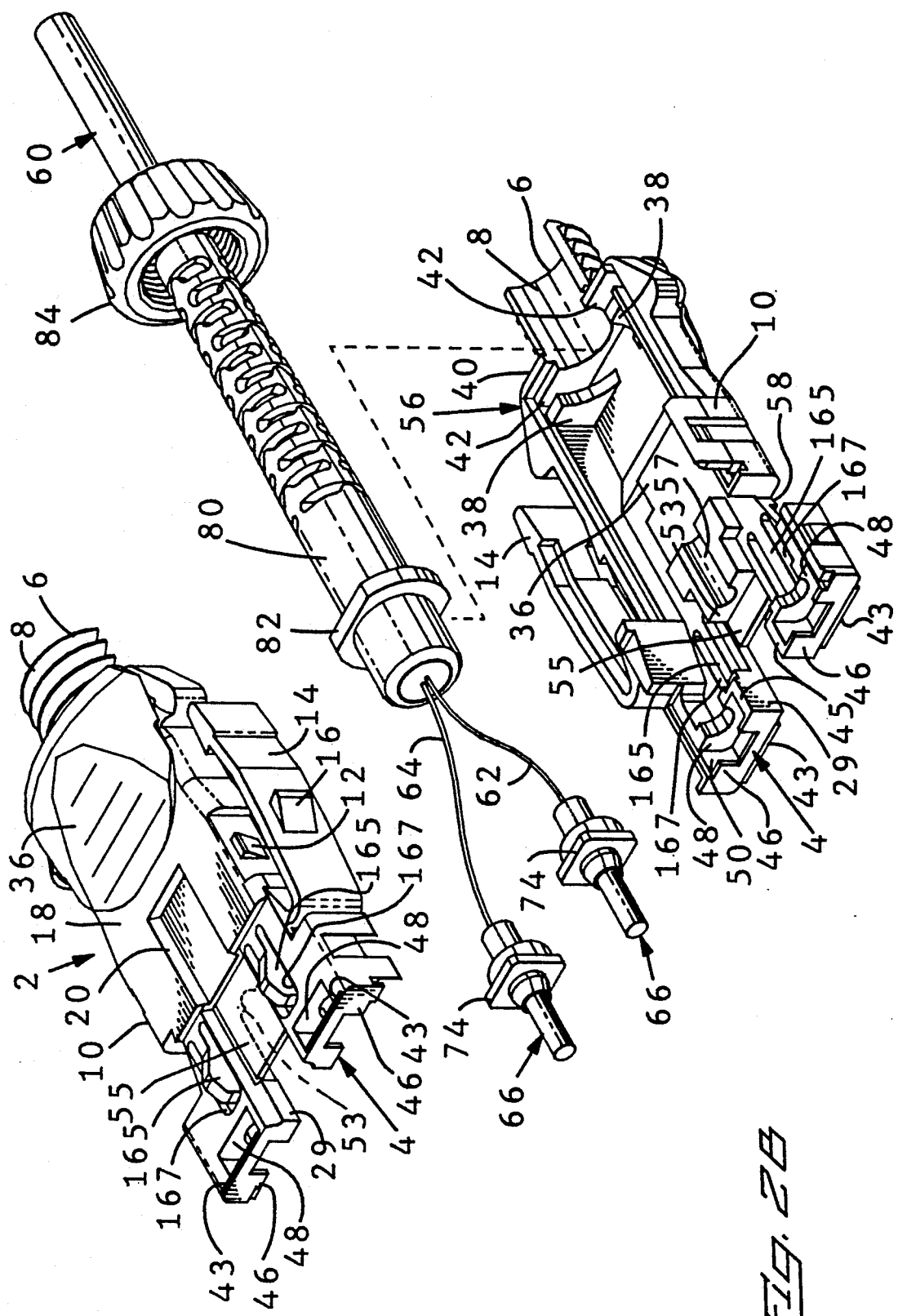

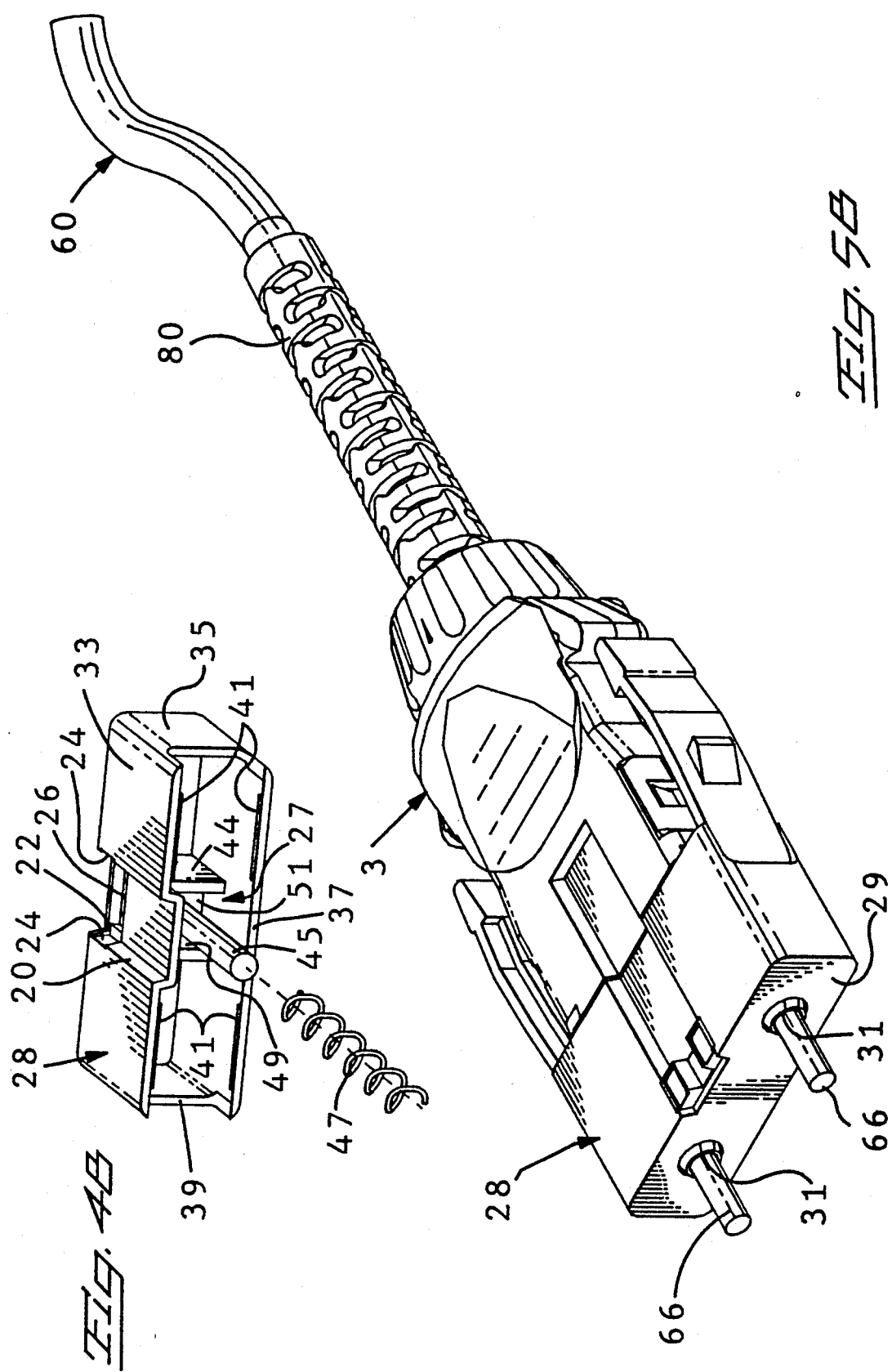

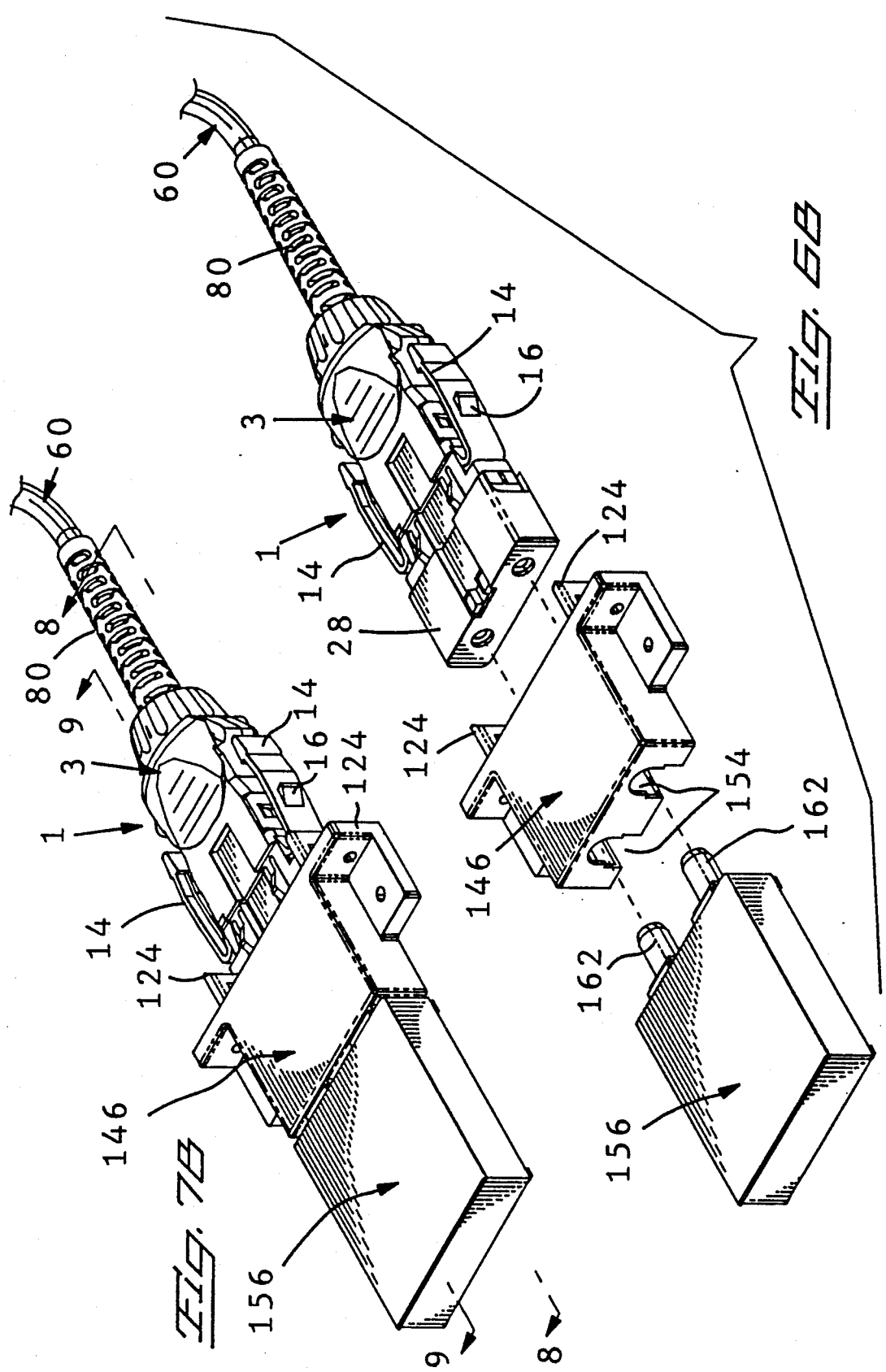

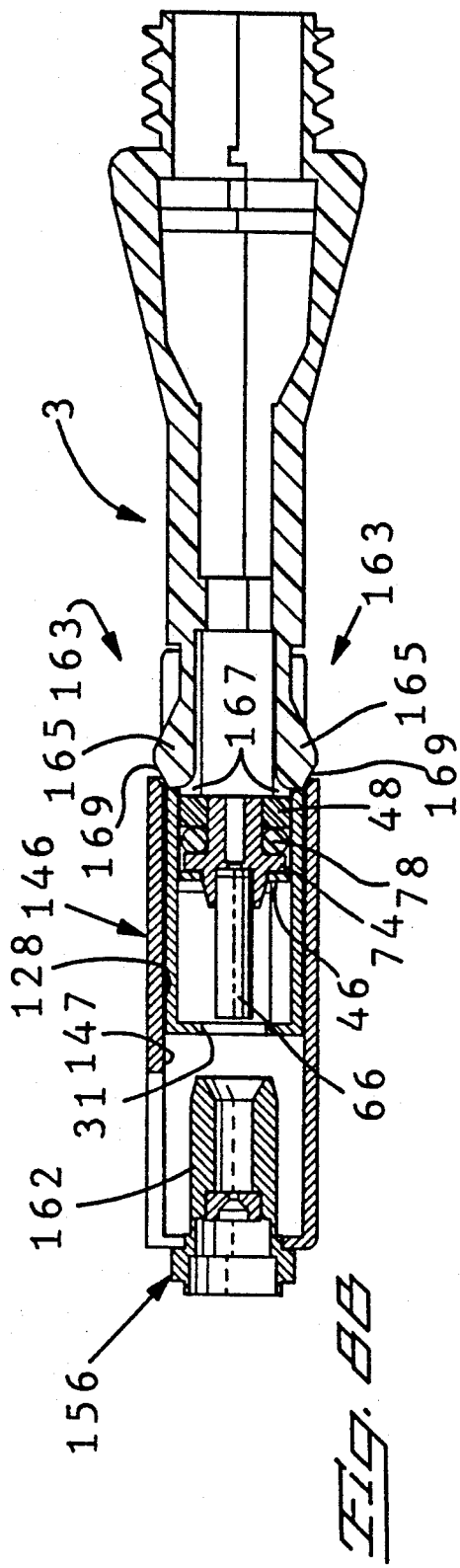
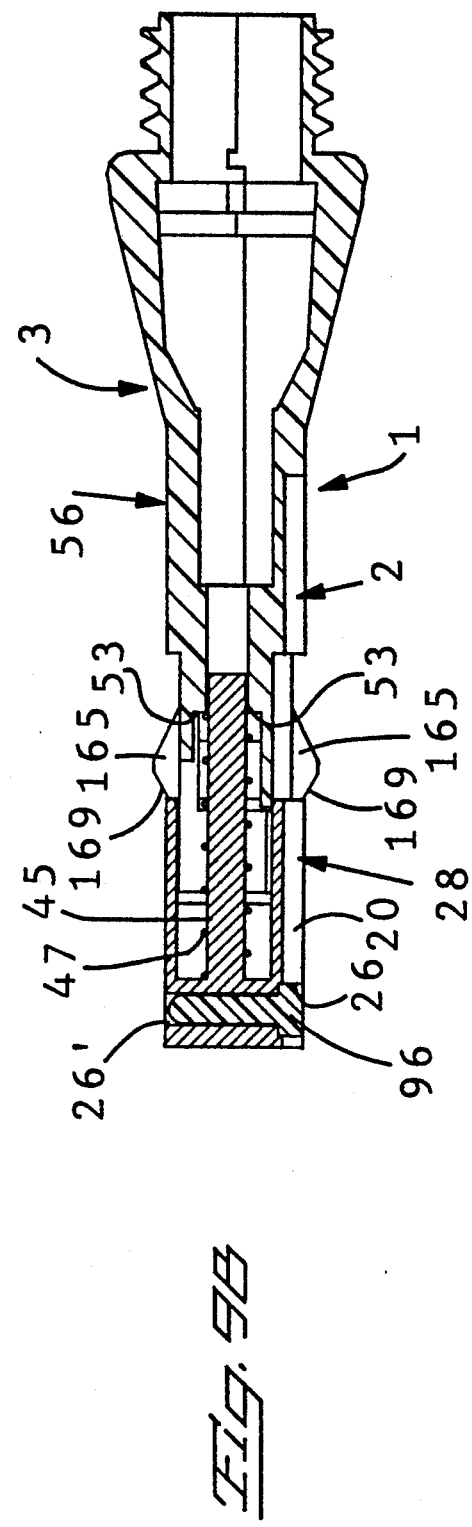
Fig. 8B
Fig. 9B

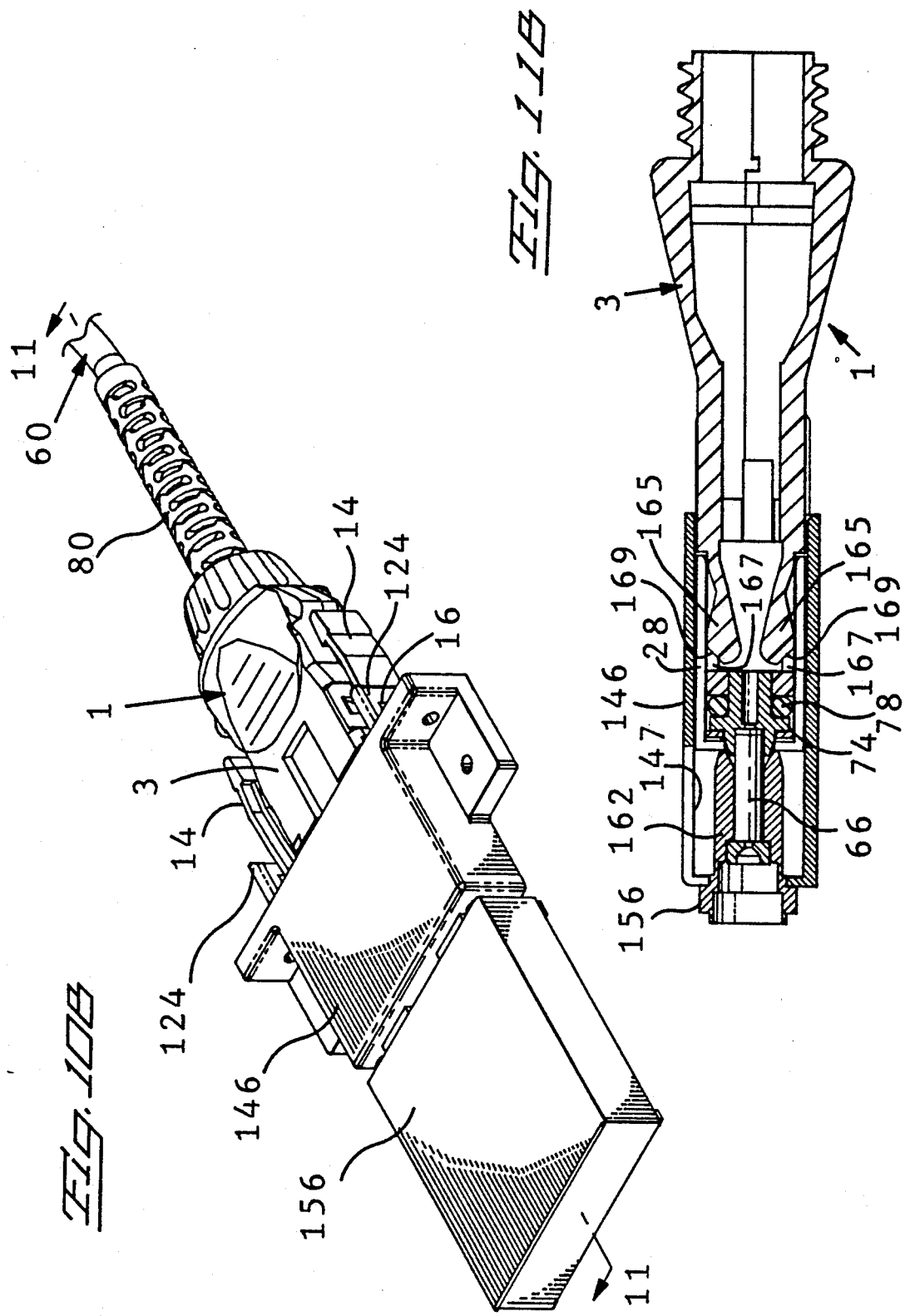

HIGH PRECISION OPTICAL FIBER CONNECTORS

This application is a Divisional of Application Ser. No. 07/439,206 filed Nov. 17, 1989, now U.S. Pat. No. 5,076,656 which is a continuation in part of the following applications:
1. Scr. No. 06/734,831 filed May 17, 1985, now abandoned in turn, a continuation in part of: Ser. No. 618,851, filed Jun. 8, 1984, now U.S. Pat. No. 4,687,291;
2. Ser. No. 236,103, filed Aug. 23, 1988, now abandoned,
3. Ser. No. 287,921 filed Dec. 21, 1988, now abandoned, in turn, a continuation in part of: Ser. No. 06/734,821, now abandoned, above, and of Ser. No. 112,188, filed Oct. 26, 1987, now abandoned, and of Ser. No. 185,756, filed Apr. 25, 1988, now abandoned; Ser. No. 185,756, now abandoned in turn, is a continuation in part of: Ser. No. 112, 188, filed Oct. 26, 1987, now abandoned, above; 4. Ser. No. 328,259, filed Mar. 23, 1989, now abandoned, in turn, a continuation in part of: Ser. No. 06/734,831, now abandoned, above, and of Ser. No. 112,188, now abandoned, above, an of Ser. No. 185,756, now abandoned above and of Ser. No. 287,921, above, now abandoned.

TECHNICAL FIELD
FIELD OF THE INVENTION

The specification describes a connector assembly for aligning a signal transmitting portion of a cable within an alignment housing.

BACKGROUND OF THE INVENTION

A known connector assembly is disclosed in U.S. Pat. No. 4,687,291, as a single fiber connector or as a duplex connector for connection to a corresponding optical fiber cable, a type of signal transmitting cable. Each optical fiber of the cable is a signal transmitting portion of the cable and is terminated with an alignment ferrule. An interconnect member includes a housing into which the connector assembly is inserted and aligned. A ferrule aligning receptor corresponding to each alignment ferrule is located in the housing. When the connector assembly is inserted into and aligned in the housing, each alignment ferrule is aligned with and inserted into a corresponding bore of a receptor. The connector assembly includes a latch for latching to the housing Accordingly, a known connector assembly for aligning each signal transmitting portion of a cable within a cavity of a housing comprises; a signal transmitting cable, each signal transmitting portion of the cable being encircled by a corresponding alignment ferrule, a connector body encircling each alignment ferrule and moveable into the cavity to align each alignment ferrule for receipt by an alignment receptor located in the housing, the connector body having a body portion to which the cable is secured.

A connector assembly is known by different forms of construction For example, a known connector assembly of U.S. Pat. No. 4,611,887, is disclosed as a plug member for a fiber optic cable, a type of signal transmitting cable. Also disclosed is a receptacle member for another fiber optic cable. The receptacle member is located in a housing. The plug member is inserted and aligned in the housing for coupling with the receptacle member located in the housing. Receptors, into which the alignment ferrules of the plug member are inserted, are on the alignment ferrules of the receptacle member, and are located within the housing together with the receptacle member.

An alignment ferrule is known in various forms of construction, disclosed by way of example in U.S. Pat. Nos. 4,233,724 and 4,303,304, and 4,440,469 and 4,646,688.

A ferrule aligning receptor located in a housing is known by various constructions such as that disclosed by way of example in the U.S. Patents.

In the known connector assembly, a front of the connector assembly provides an immobile shroud. The alignment ferrules are covered and protected by the shroud. Because the shroud is immobile, the housing in which the receptors are located must have dimensions to accommodate the shroud forwardly of the alignment ferrules If the shroud were moveable to uncover the ferrules, the dimensions would no longer be required, and further the housing could be shortened.

SUMMARY OF THE INVENTION

The connector assembly according to the invention includes a shroud that covers and protects each alignment ferrule and is moveable to project each alignment ferrule outwardly of the shroud for receipt in a ferrule aligning receptor located in a housing. Once the ferrules are aligned within the housing for receipt by corresponding receptors, the housing will protect the ferrules, and thereby the shroud is unnecessary.

Although a moveable shroud is disclosed above as being useful, a latch is required to resist movement of the shroud so that the shroud remains in a position to cover and protect each alignment ferrule until the connector assembly is aligned within a housing, and the latch is constructed to permit movement of the shroud to uncover each ferrule for receipt by a corresponding receptor located in the housing According to the invention, a connector assembly includes a shroud mounted to a body portion of the connector assembly for movement to a first shroud position covering each alignment ferrule, and the shroud is moveable relative to each alignment ferrule to a second shroud position to uncover each alignment ferrule, and a biasing member is between the housing and the shroud for biasing the shroud toward the first position, a moveable latch on the connector body in a first latch position engages against the shroud and resists movement of the shroud from the first position, the latch projects outwardly beyond the shroud circumference for engaging the housing and for deflection by the housing to a second latch position, the latch in the second latch position permitting relative movement of the shroud over the latch to the second shroud position, and the shroud is moveable over the latch to the second shroud position upon said deflection of the latch by the housing from the first latch position to the second latch position to project each alignment ferrule outwardly of the shroud for receipt by a corresponding receptor located in the housing.

An embodiment of the invention will be disclosed by way of example with reference to the accompanying drawings.

DESCRIPTION OF THE DRAWINGS

FIG. 1 is an enlarged fragmentary elevation view of a connector assembly with a shroud in a first position.

FIG. 2 is a fragmentary perspective view with parts exploded of a connector body of the connector assembly as shown in FIG. 1 and with the shroud removed

FIG. 4 is a perspective view of a rear end of the shroud.

FIG. 5 is an enlarged fragmentary elevation view of the connector assembly with the shroud in a second position.

FIG. 6 is a fragmentary perspective view with parts exploded of a receptacle housing and a transceiver, together with the connector assembly FIG. 7 is an elevation view in section of the transceiver shown in FIG. 6 assembled to the receptacle housing and the connector assembly partially inserted in the receptacle housing.

FIG. 8 is a section view taken along the line 8—8 of FIG. 7.

FIG. 9 a section view taken along the line 9—9 of FIG. 7.

FIG. 10 is a view similar to FIG. 7 illustrating complete insertion of the connector assembly into the receptacle housing.

FIG. 11 is a section view taken along the line 11—11 of FIG. 10.

With reference to FIGS. 1 and 2 of the drawings, there is shown a connector assembly 1 for an optical fiber cable including a top portion 2 and a bottom portion 56 assembled together to provide a body portion 3. Each of portions 2 and 56 includes a corresponding front end 4, an externally threaded cable entry 8 on a rear portion 6, a corresponding latch or hasp 10, a corresponding lug 17, a latching arm 14 including a latching lug 16, an external gripping surface 34 near the cable entry projecting outwardly inclined toward the rear 6. The rear portion 6 projects from a transverse exterior wall 40. Adjacent to the wall 40 and extending into a hollow interior cavity 36 is an interior flange 38 facing each side of the cable entry 8, with a transverse slot 42 between each flange 38 and the wall 40. Extending into a hollow interior cavity 36 of each portion 2 and 56 are a pair of spaced apart transverse ridges 46 and 48, on either side of the gap 29 and connected by a ridge 45 along each side of the gap 29. A cavity 50 is between each pair of the spaced apart ridges 46 and 48. Rectangular recesses 52 and semicircular recesses 54 in the corresponding ridges 46 and 48 communicate wit the cavities 50. The structure of the portions 2 and 56 extend toward corresponding open sides of the portions 2 and 56.

Figure 3B:
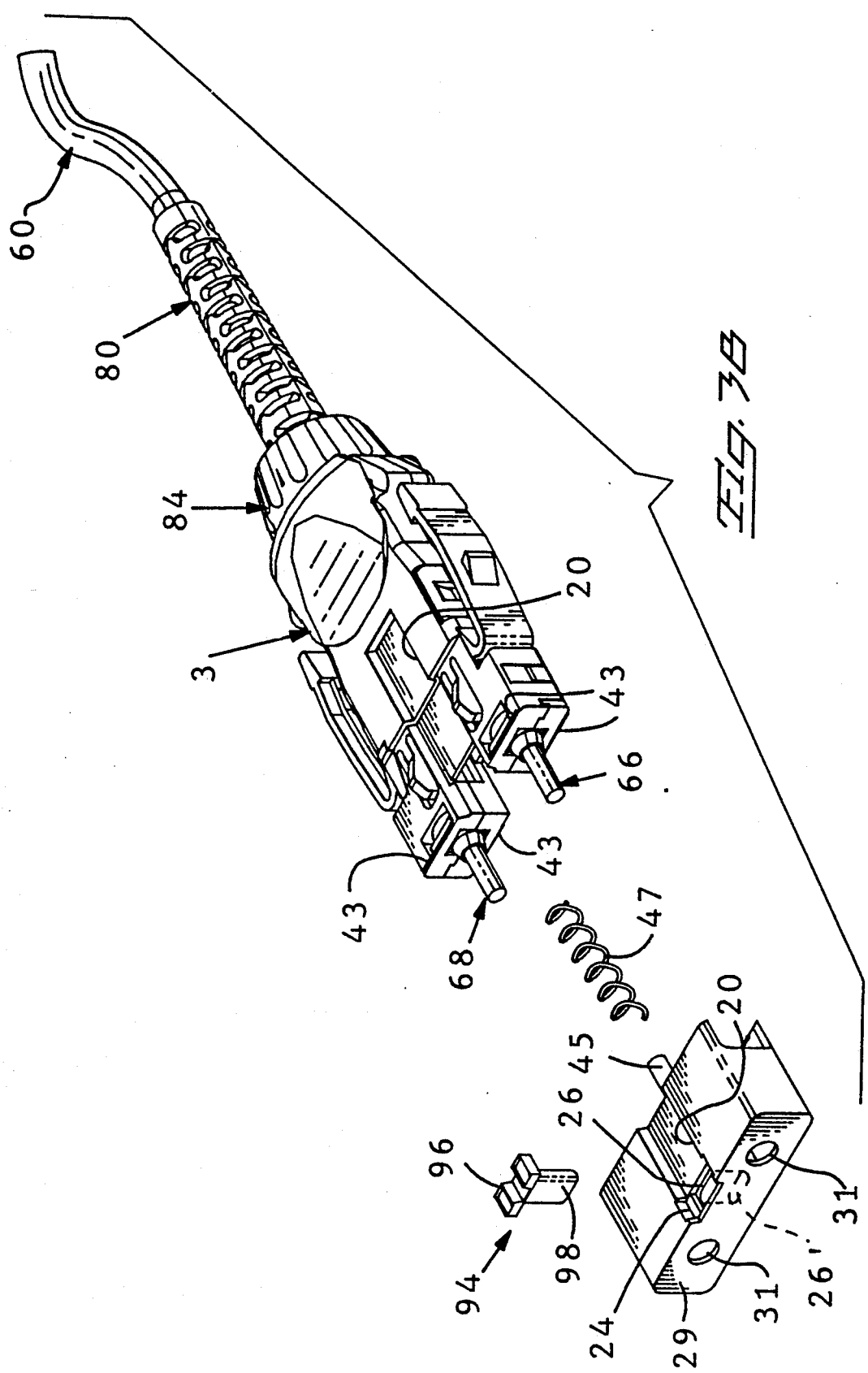
FIG. 3 is a fragmentary perspective view of the connector body and the shroud.

The body portions 2 and 56 are of unitary molded plastics construction and are duplicates of each other except for the following construction. The top portion 2 includes a channel or keyway 20 extending axially rearward form the front end 4 and recessed in an exterior side surface or side wall 18. A gap 29 is located in each front end 4, and in the portion 2 is aligned with the keyway 20. The bottom portion 56 has an exterior side surface or side wall 58 like the exterior wall 18 but without the recessed keyway 20.

With reference to FIG. 2, an optical fiber cable 60 includes optical fibers 62 and 64 terminated by corresponding alignment ferrules 66 and 66. A radially extending flange 74 and a resilient ring 78 encircles each of the ferrules 66 and 66. A sleeve form strain relief 80 encircles the exterior of the cable 60 form which project the fibers 62 and 64. An internally threaded nut 84 rotatably encircles the strain relief 80 axially to the rear of a radially projecting flange 82 secured integrally with the strain relief 80.

The portions 2 and 56 are assembled to each other, with the open sides of the portions 2 and 56 facing each other. The portions 2 and 56 together encircle the strain relief 80, the flange 82, the fibers 62 and 64, the flanges 74 and 74, and the alignment ferrules 66 and 66. The strain relief 80 projects along each cable entry 8. The flange 82 is in each cavity 42. The fibers 62 and 64 extend along each interior cavity 36. The flanges 74 and ring 78 are received in corresponding cavities 50. The alignment ferrules project through the corresponding recesses 52 and 54 and from a front 4 of the body portion 3 formed by the portions 2 and 56. The portions 2 and 56 lock together by interengaged lugs 16 latched in corresponding latches or hasps 10. The nut 84 is threadably advanced along each rear portion 6 and against each rear wall 40.

Additional details of the connector assembly are incorporated herein by reference from the disclosure of the above referenced U.S. Patent Application. A connector assembly as disclosed in that Patent Application includes a shroud 28 that is immobile. The immobile shroud is not interchangeable with shrouds of different circumferential shapes adapted for alignment in different housings.

As shown in FIGS. 3 and 4, a removable shroud 26 of unitary molded plastics construction has a rear passage 27 for assembly over a front of the body portion 3. A front end of the shroud is defined by a front end wall 29 opposite the open end 27. The front end wall 29 has an opening 31 aligned with and corresponding to each alignment ferrule 66 and 66. Exterior circumferential side walls 33, 35, 37 and 39 extend rearwardly from the end wall 29 and encircle the passage 27. A plurality of interior facing ribs, each shown at 41, project transversely along the interiors of corresponding walls 33 and 37 and adjacent to the open end. Similar ribs, each shown at 43, project transversely along the exteriors of corresponding walls 18 and 58 of the body portion 3, and are adjacent the front end of the body 3. When the shroud 28 is being assembled to the body portion 3, or is being removed from the body portion 3, the ribs 41 interengage corresponding ribs 43 such that force must be exerted to displace the ribs 41 over and past the corresponding ribs 43. The interengaging ribs 41 and 43 form restraint means on the body portion 3 and the shroud 28 for restraining movement of the rear of the shroud 28 over the front of the body portion 3, and the restraint means is capable of deflection under forcible movement of the rear of the shroud 28 over the front of the body portion 3 during assembly or disassembly of the shroud 28.

The shroud is in a first position covering the alignment ferrules 66 and 66. The shroud is moveable from the first position to a second shroud position uncovering the alignment ferrules 66 and 66 and to project them from the shroud 28 as shown in FIG. 5. Further with reference to FIG. 2, a moveable latch 163 is on each portion 2 and 56. The latch 163 includes a pair of spaced apart fingers 165. Each finger 165 is elongated axially forward toward the front of the connector body 3 and is formed by a slit 167 along three sides of the corresponding finger 165 and extending through the thickness of the corresponding wall 18 or 58. Each finger 165 is moveable separate from the other from a first position engaging the shroud to a second position inwardly into the connector body 3 permitting relative movement of the shroud 28 over said finger 165 to the second shroud position. Upon movement of the shroud to the second shroud position, each finger 165 will return by internal resilient spring action to the first position engaging the shroud and resisting movement of the shroud to the second shroud position.

With reference to FIGS. 1, 2 and 3, the side wall 33 overlies the wall 18 of the body portion 3. The keyway 20 extends, as shown in FIG. 1, from the body portion 3, and in and along the side wall 33, to the front end 29 of the shroud 28. A detent or recess 22 is in the keyway 20 of the shroud 28, and extends laterally across and into the side walls of the keyway 20, forming notches in the side walls recessed in the outer surface 18. An aperture or passage 26 extends from the recess 22 transversely through the thickness of the shroud. The thickness forms a bulkhead 44 of rigid mass surrounding the passage 26. The passage 26 emerges as an aperture portion 26' through the opposite exterior surface of the shroud. The passage is tapered along its length toward the aperture portion 26'.

A keying element or keying plug 94 of unitary construction includes a tapered elongated post 98 constructed for a friction fit in and along the passageway 26. The end of the post 98 is located at the aperture portion 26' and is accessible to be urged against to displace the keying plug outwardly of the recess 22, thereby to be grasped and removed for replacement by a desired key of the type disclosed in the above referenced U.S. Patent Application. The keying plug 94 includes an enlarged block form portion 96 conforming in dimensions to fit within the recess 22. Additional details of the keying structure are incorporated herein by reference from the disclosure of the above referenced U.S. Patent Application.

With reference to FIGS. 3 and 4, an axially extending rod 45 projects rearwardly from the bulkhead 44. A coil spring 47 encircles the rod 45 with a front end of the spring 47 received in a recess 49 of the bulkhead 44 and engaged against an axially recessed wall 51 of the bulkhead 44.

With reference to FIG. 2, each portion 2 and 56 includes a rod support wall 53 projecting into the corresponding cavity 36 at a rear end of the gap 29. A front extending flange 55 of the rod support wall 53 recesses the rod support 55 along the gap 29. An axially extending passage 57 along the rod support 55 slidably encircles and supports the rod for reciprocation in the body portion 3. A rear end of the spring 47 engages the rod support wall 53 and is in compression between the wall 51 and the rod support wall 53 to bias the shroud to the first shroud position A force is required against the shroud for movement of the shroud to the second shroud position against the bias of the spring 47. When the force is removed, the spring will bias and move the shroud to the fist shroud position covering and protecting the alignment ferrules 66 and 66. The interengaging ribs 41 and 43 resist the bias of the spring 47 to resist removal of the shroud form the connector body 3.

With reference to FIGS. 6 and 7, the connector assembly 1 including the shroud 28 is positioned for insertion and alignment in a receptacle or housing 146. By way of example, the above identified U.S. Patent Application discloses several types of receptacles or housings into which the connector assembly 1 is suitable for insertion and alignment. An input port 162 and an output port 162 of a transceiver 156 are assembled into corresponding openings 154 of the housing 146. The ports 162 and 162 are receptors of corresponding sleeve form for receiving and aligning corresponding alignment ferrules 66 and 66 with the transceiver, when the connector assembly 1 is received and aligned in the housing 146 for mateable connection with the transceiver 156.

With reference to FIGS. 7 and 8, the connector assembly 1 is shown with the shroud 28 in the first shroud position within the housing 146 assembled to the transceiver ports 162 and 162. The outer circumference of the shroud is less than the circumference of a cavity 147 of the housing 146 for receipt in the housing 146 and for aligning the connector assembly 1 in the housing 146 in preparation for mated connection of the alignment ferrules 162 and 162 by receipt in the corresponding receptors 162 and 162. The housing is keyed in a manner as disclosed in the above identified U.S. Patent Application to cooperate with the keying plug 96 or other keying plugs and to form keying combinations that will permit entry of the keying plug 96 or the other keying plugs within the cavity 147.

The shroud is in registration within the cavity 147 and is moveable to the second shroud position, as shown in FIGS. 5 and 10 and 11, to permit movement of the connector body 3 forwardly in the cavity 147. The lugs 16 on the latch arms 14 relasably lock in hasps 124 on the housing 146 to retain the connector assembly 1, in the housing 146.

Both fingers 165 of each latch 63 project outwardly beyond the shroud circumference for engaging the housing, and both fingers are required to be deflected by the housing to the corresponding second positions to permit movement of the shroud to the second shroud position.

Each of the fingers 165 of each latch 63 in a first latch position engages against the shroud 28 and resists movement of the shroud 28 from the first shroud position. Each of the fingers 165 of each latch 63 has a rearwardly inclined biasing surface 169 that projects outwardly beyond the shroud circumference for engaging the housing 146 and for deflection by the housing 146 to a second latch position, the fingers of each latch 63 in the second latch position permitting relative movement of the shroud 28 over the latch 63 to the second shroud position The shroud 28 is moveable over the latch 63 and each of its fingers 165 to the second shroud position upon said deflection of each of the fingers 165 of each latch 63 by the housing 63 from the first latch position to the second latch position to project each alignment ferrule 66 and 66 outwardly of the shroud 28 for receipt by a corresponding receptor 162 and 162 located in the housing 146.

Other housings of different construction are known. The shroud 28 is removable and is adaptable with a different shape or different length for complementary alignment within a housing 146 of different shape or different length. The shroud 128 is removable for interchange with a shroud 128 of such different shape or different length.

What is claimed is:

1. In a connector assembly for aligning each signal transmitting portion of a cable within a cavity of a housing and comprising:
   a signal transmitting cable encircled by a corresponding alignment ferrule;
   a connector body, having a portion to which the cable is secured and a portion that encircles the alignment ferrule, said connector being movable into the cavity to align each alignment ferrule for receipt by an alignment receptor located within the housing;

a shroud, mounted to the connector body and adapted for movement between a first shroud position, where the shroud is disposed forwardly from the connector body and each alignment ferrule is covered, and a second shroud position, where the shroud is disposed rearwardly towards the connector body and each alignment ferrule is uncovered, the shroud having a recess to interchangeably accept one of a plurality of keying plugs;

a biasing member between the connector body and the shroud for biasing the shroud forwardly from the connector body;

a moveable latch within the connector body having a first latch position, wherein said latch projects outwardly form the connector body to engage the shroud for resisting movement of the shroud between the fist shroud position and the second shroud position, and a second latch position wherein said latch is deflected inwardly towards the connector body, permitting relative movement of the shroud over the latch.

2. In a connector assembly as recited in claim 1, wherein the latch is a pair of spaced apart fingers, each finger is moveable separate from the other from a first position engaging the shroud to a second position permitting relative movement of the shroud over said finger to the second shroud position, both fingers project outwardly beyond the shroud circumference for engaging the housing, and both fingers are required to be deflected to the corresponding second position to permit movement of the shroud to the second shroud position.

3. In a connector assembly as recited in claim 2 wherein the shroud is further adapted to have an external shroud circumference less than the circumference of the cavity and the shroud extends forward of the latch to extend within the cavity of the housing prior to engaging the latch with the housing.

4. In a connector assembly as recited in claim 2, wherein the plurality of spaced apart fingers and the connector body are of unitary construction.

5. In a connector assembly as recited in claim 1, further comprising; a keyway extending from the front of the shroud to the rear of the shroud.

6. In a connector assembly as recited in claim 1, wherein the recess is further adapted to provide a frictional interference fit with the keying plug.

7. In a connector assembly as recited in claim 1, wherein the connector body is made of molded plastic.

8. In a connector assembly for aligning each signal transmitting portion of a cable within a cavity of a housing and comprising:

a signal transmitting cable encircled by a corresponding alignment ferrule;

a connector body, having a portion to which the cable is secured and a portion that encircles the alignment ferrule, said connector being movable into the cavity to align each alignment ferrule for receipt by an alignment receptor located within the housing;

a shroud, mounted to the connector body movable between a first shroud position, where the shroud is disposed forwardly form the connector body and each alignment ferrule is covered, to a second shroud position, where the shroud is disposed rearwardly towards the connector body and each alignment ferrule is uncovered;

a biasing member between the connector body and the shroud for biasing the shroud forwardly form the connector body;

a moveable latch of unitary construction with the connector body, having a first latch position, wherein said latch projects outwardly form the connector body engage and resist movement of the shroud between the first shroud position and the second shroud position, and a second latch position wherein said latch is deflected inwardly towards the connector body, permitting relative movement of the shroud over the latch.

9. In a connector assembly as recited in claim 1, the improvement further comprising; an opening in a front end of the shroud aligned with each alignment ferrule, the alignment ferrule projecting through the opening with the shroud in the second shroud position.

10. In a connector assembly as recited in claim 1, the improvement further comprising; a rear of the shroud has a passage for assembly over a front of the body portion, restraint means on the housing portion and the shroud for restraining movement of the rear of the shroud over the front of the body portion, and the restraint means is capable of deflection under forcible movement of the rear of the shroud over the front of the body portion during assembly or disassembly of the shroud.

11. In a connector assembly as recited in claim 1, the improvement further comprising; a rod on the shroud extends toward the body portion, the biasing member is a coil spring encircling the rod, the housing portion includes a transverse wall, an opening int eh transverse wall receives the rod, and a rear end of the spring opposes the transverse wall.

12. In a connector assembly as recited in claim 8, wherein the connector body and the moveable latch are made of molded plastic.

13. In a connector assembly as recited in claim 12, wherein a recess to interchangeably accept a keying plug is incorporated into the shroud.

14. In a connector assembly as recited in claim 8, further comprising a keyway extending from the front of the shroud to the rear of the shroud.

* * * * *

UNITED STATES PATENT AND TRADEMARK OFFICE
CERTIFICATE OF CORRECTION

PATENT NO. : 5,259,052
DATED : November 2, 1993
INVENTOR(S) : Robert C. Briggs, et al.

It is certified that error appears in the above-identified patent and that said Letters Patent is hereby corrected as shown below:

In claim 1, column 7, line 20, "form" should be --from--.

In claim 8, column 8, line 17, "form" should be --from--.

In claim 8, column 8, line 22, "form" should be --from--.

Col. 8, claim 11, line 47, "int eh" should be --in the--

Signed and Sealed this

Twelfth Day of April, 1994

Attest:

BRUCE LEHMAN

Attesting Officer     Commissioner of Patents and Trademarks